United States Patent [19]

Kawaguchi et al.

[11] Patent Number: 4,905,528
[45] Date of Patent: Mar. 6, 1990

[54] ELECTRIC ACTUATOR

[75] Inventors: Chikara Kawaguchi, Toyohashi; Kiyohide Terada, Kosai, both of Japan

[73] Assignee: ASMO Co., Ltd., Kosai, Japan

[21] Appl. No.: 247,353

[22] Filed: Sep. 21, 1988

[30] Foreign Application Priority Data

Sep. 22, 1987 [JP] Japan .................. 62-144643[U]

[51] Int. Cl.⁴ ........................................... F16H 21/54
[52] U.S. Cl. .................................. 74/102; 74/99 R; 74/625; 292/201; 292/336.3
[58] Field of Search ............... 74/99 R, 102, 103, 104, 74/625; 292/201, 336.3

[56] References Cited

U.S. PATENT DOCUMENTS

| 4,160,389 | 7/1979 | Kubono | 74/109 X |
| 4,322,022 | 3/1982 | Bergman | 74/424.8 A X |
| 4,739,677 | 4/1988 | Kofink et al. | 74/625 |

Primary Examiner—Allan D. Herrmann
Attorney, Agent, or Firm—Burns, Doane, Swecker & Mathis

[57] ABSTRACT

An electric actuator, in which the rotation of the motor is transmitted to the output rod through a pin mounted on a gear connected to motor through the other gears. A stopper is formed on the output rod connected to a door knob, and a pivotal arm mounted on the output rod. A coupling is provided not to transmit the movement of the output rod caused by the door knob, whereby the door is locked or unlocked not only by a remote control, but also by a manual operation of the door knob.

4 Claims, 5 Drawing Sheets

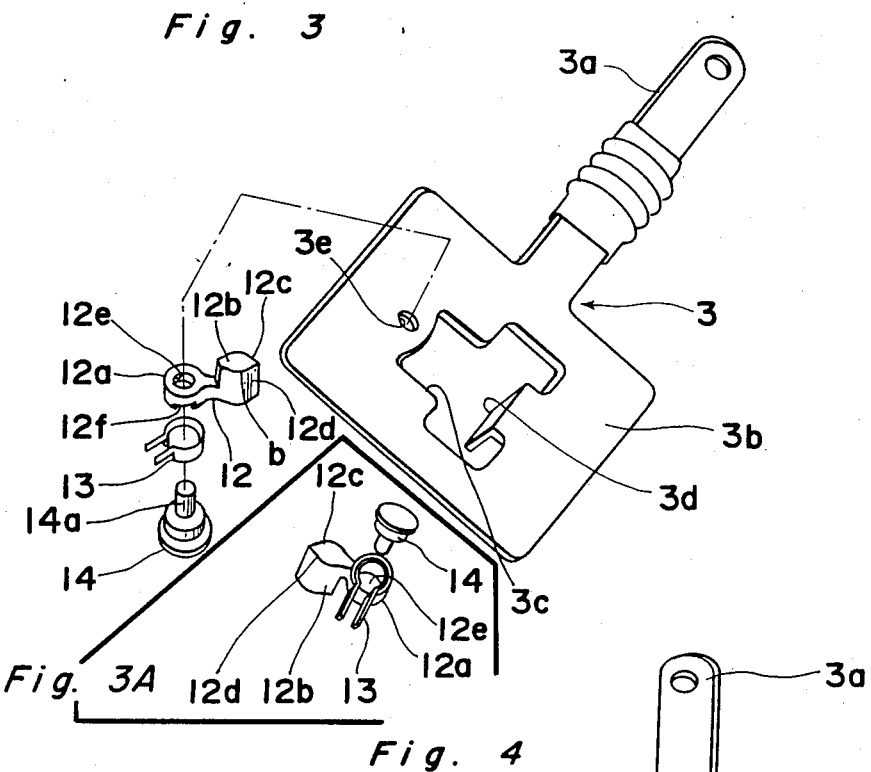
Fig. 3
Fig. 3A
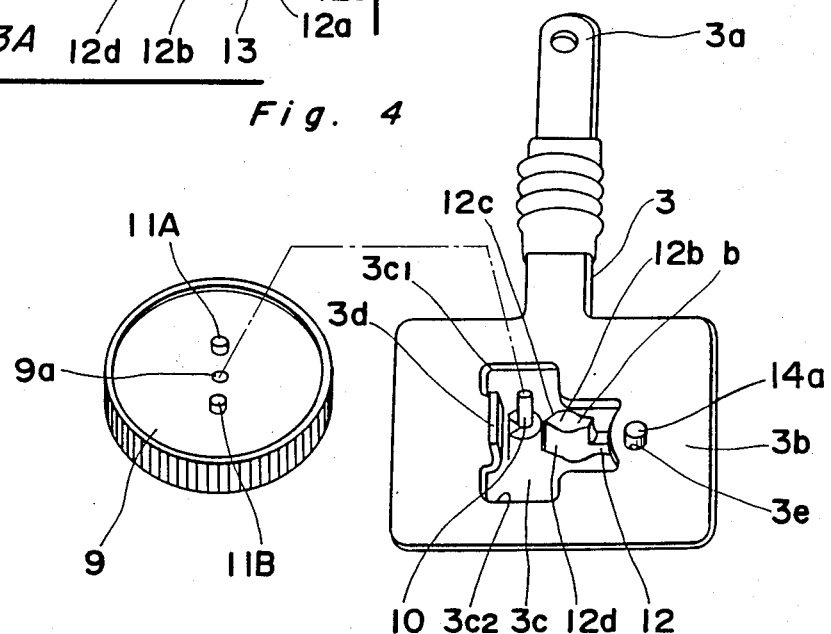
Fig. 4

Fig. 6(III)
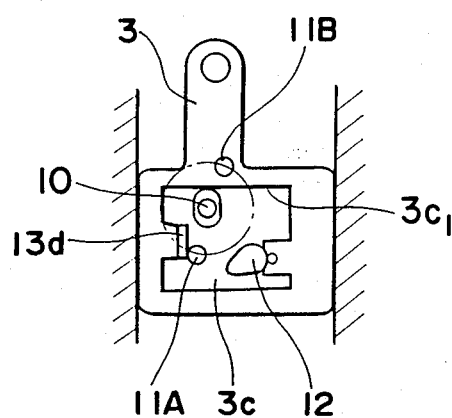

Fig. 7(III)
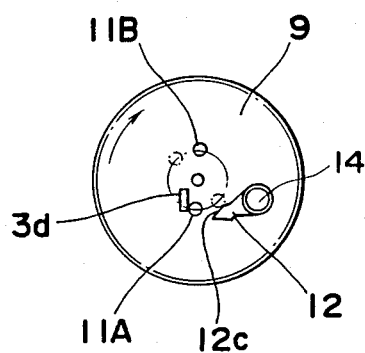
Fig. 7(VII)
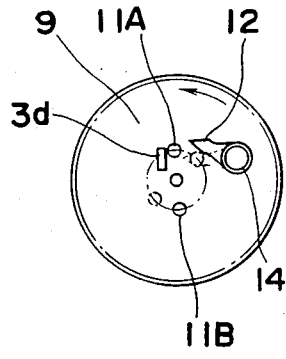

ELECTRIC ACTUATOR

BACKGROUND OF THE INVENTION

1. Field of the Invention

The present invention relates to an electric actuator, and more particularly, to an actuator for use in an electric door lock device mounted in a vehicle. Doors of the vehicle are locked or unlocked by operating the electric actuator not only by a remote control, but also by a manual operation.

2. Description of Related Art

An electric actuator of this type is proposed in Japanese Patent Publication No. 54-30316. According to the disclosure, the rotation of a motor is transmitted to a speed reducer through a centrifugal clutch, the output of the speed reducer is transmitted through a sector to an output rod which moves rectilinearly, and a door lock operation member connected to the output rod is operated. Thus, the door is locked or unlocked. During a manual locking or unlocking operation, the operation of the output rod is not transmitted to the motor through the centrifugal clutch.

According to the above-described mechanism, the clutch slides after the door lock or the door unlocking operation is performed by the motor, thus generating an uncomfortable sound. In order to prevent the generation of the sound, a limit switch for interrupting the flow of electric current is required when a predetermined locking or unlocking operation process has been performed, which causes the mechanism to be complicated and its manufacturing cost to be high.

Another mechanism is proposed in Japanese Utility Model Laid-Open Publication No. 59-74267. According to the disclosure, a cam gear driven by a motor is provided, the operation of the cam gear is transmitted to an external rotary lever through an internal rotary lever, and a door lock operation member is actuated by the external rotary lever.

This mechanism using the cam gear makes no sound, but it is necessary to make the diameter of the cam gear greater than the stroke of the rotary lever, which necessitates the provision of a large cam gear. Accordingly, the electric actuator is not compact.

SUMMARY OF THE INVENTION

The present invention has been made with a view to substantially solving the above-described problem and has for its essential object to provide an electric actuator which makes no uncomfortable sound and is compact even though the stroke of an output rod is long, and the construction of the electric actuator is simple, and a manual operation can be simply performed using an external member such as a door knob.

In accomplishing this and other objects, according to one preferred embodiment of the present invention, an electric actuator in which an external operation member is controlled by an electric motor comprises a gear rotatably mounted by a main shaft fixed to a casing and driven by the motor mounted in the casing; an output rod whose top portion projects from the casing is connected to the external operation member and rectilinearly reciprocatively mounted on the casing; and a coupling which is provided between the gear and the output rod, and transmits the rotation of the motor to the output rod so that the output rod is reciprocated, and transmits the reciprocative motion of the output rod caused by the external member neither to the gear nor to the motor.

The coupling of the electric actuator is provided with a pin mounted on the gear; the output rod including a pivotal arm and a stopper brought into or out of contact with the pin; an opening to allow the movement of the opening to be free relative to the main shaft of the gear provided therein; wherein the rotation of the gear caused by the motor allows the pin to be brought into contact with the pivotal arm, and the pin is stopped when the pin contacts with the stopper.

When the output rod is manually operated to move from the position at which the pin has stopped, the coupling is in the position at which neither the pivotal arm nor the stopper contact with the pin, so that the operation of the output rod can be controlled by the external operation member without interlocking the output rod with the motor and the gear.

The pivotal arm is so configured that a side face thereof is parallel with the tangent to the pin at the contact point of the side face thereof with the pin so that only the pin is capable of making a circular movement when the output rod has reached the stroke end. The pivotal arm is returned to a predetermined position by a spring after the pin is out of contact with the pivotal arm.

The stopper prevents the pin from making a circular movement in the direction in which the pin becomes remote from the pivotal arm only when the pin is brought out of contact with the pivotal arm after the output rod reaches the stroke end thereof.

BRIEF DESCRIPTION OF THE DRAWINGS

This and other objects and features of the present invention will become apparent from the following description taken in conjunction with a preferred embodiment thereof with reference to the accompanying drawings, throughout which like parts are designated by like reference numerals, and in which:

FIG. 3 an exploded view showing an output rod and members to be mounted thereon;

FIG. 3A is an exploded view of a coupling;

FIG. 4 is a perspective view showing how a gear carrying pins is mounted on an output rod;

DETAILED DESCRIPTION OF THE INVENTION

Figure 1:
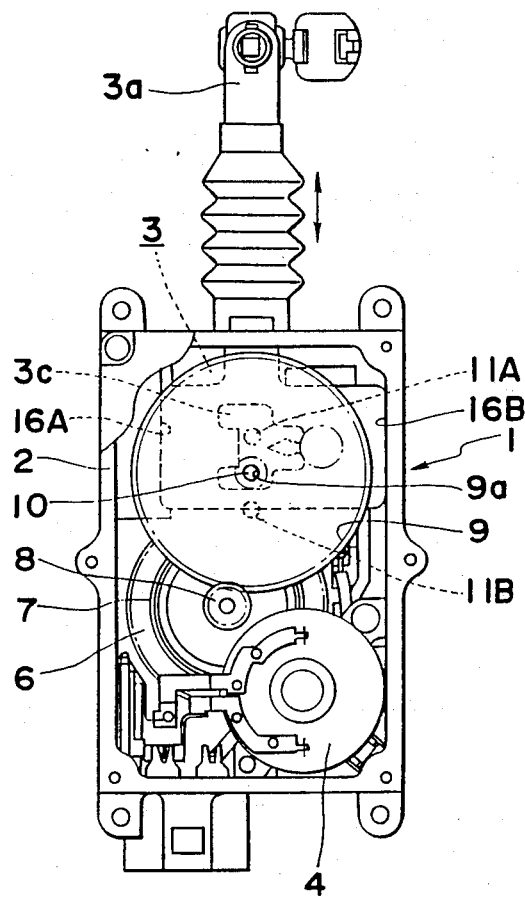
FIG. 1 is a front view showing an electric actuator according to the present invention.
Figure 2:
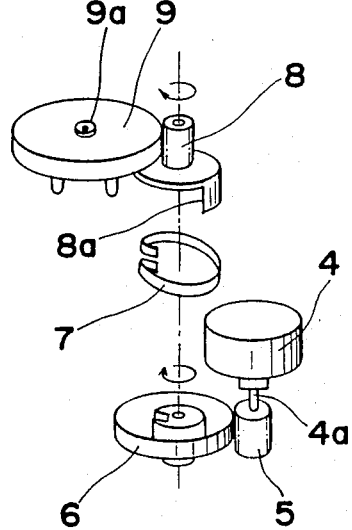
FIG. 2 is a partially exploded view of the principal portion of the electric actuator shown in FIG. 1.

Referring to FIG. 1 showing an electric actuator 1, a casing 2 is fixed inside a vehicle door. An approximately T-shaped output rod 3 is reciprocatively accommodated in casing 2, namely, in the direction shown by an arrow. The top portion 3a of the output rod 3 projecting from the casing 2 is connected with an unshown door lock member. Referring to FIG. 2, a gear 5 is fixed to the output shaft 4a of a motor 4 mounted in the casing 2. The gear 5 engages with a reduction gear 6 in which a spring 7 and a gear 8, carrying a projection 8a which fixes the spring 7, are mounted. The rotation of the motor 4 is transmitted to the gear 8 through the spring 7. A gear 9 with the largest diameter, on which pins 11A and 11B are mounted, engages with the gear 8.

A main shaft 10 fixed to the casing 2 is inserted into the opening 9a formed in the center of the gear 9 so that the gear 9 is capable of rotating. The output rod 3 is disposed below the gear 9. A coupling (A), shown in FIG. 3A, is disposed between the gear 9 and the output rod 3 transmits the rotation of the gear 9 to the output rod 3 as the rectilinear motion of the output rod 3, thereby allowing the output rod 3 to make a rectilinear motion. However, the coupling (A) has the function of preventing the movement of the output rod 3 caused by a manual, external operation from being transmitted to the gear 9. The detailed description of the construction of the coupling (A) is made hereinbelow. As shown in FIG. 4, the pins 11A and 11B mounted in the undersurface of the gear 9 are symmetrical with each other with respect to the center of the gear 9. An opening 3c configured as shown in FIGS. 3 and 4 is formed in the center of the rectangular portion of the output rod 3 disposed below the gear 9. As shown in FIG. 4, a stopper 3d for stopping the circular motion of pins 11A or 11B is upward from the center portion of one side of the opening 3c. An opening 3e for mounting a pivotal arm 12 is mounted ar a point of the rectangular portion with a certain distance provided from the edge which faces the stopper 3d. The pivotal arm 12 and the spring 13 for returning the pivotal arm 12 to its neutral position are rotatably mounted in the opening 3e through a pin 14a as shown in FIG. 3. As shown in FIGS. 3 and 4, the pivotal arm 12 comprises a pin-mounting portion 12a, a contact portion 12b including side faces 12c and 12d. The configuration of the pivotal arm 12 is V-shaped in a transverse sectional view. A spring-mounting portion 12f is concave from the outer circumferential face of the pin-mounting opening 12e of the pin-mounting portion 12a. The pin 14 is inserted through the pin-mounting portion 12e with the spring 13 fitted in the spring-mounting portion 12f. The urging force of the spring 13 allows the contact portion 12b of the pivotal arm 12 to face the stopper 3d. The contact portion 12b is in the neutral position when no load is applied thereto. The contact portion 12b of the pivotal arm 12 and the stopper 3d project upward from the opening 3c so that the pins 11A and 11B projecting downwards from the gear 9 disposed over the output rod 3 are brought into or out of contact with the contact portion 12b of the pivotal arm 12 and the stopper 3d. When the pins 11A and 11B make circular movements caused by the rotation of the gear 9, the pins 11A and 11B contact with the side face 12c or 12d of the pivotal arm 12, thus causing the pivotal motion of the pivotal arm 12. The output rod 3 on which the pivotal arm 12 is rotatably mounted is forced to move rectilinearly along the guides 16A and 16B of the casing 2 shown in FIG. 1. With the rectilinear movement of the output rod 12 in the casing 2, either the edge face 3c₁ or 3c₂ of the opening 3c of the output rod 3 contacts with the main shaft 10, with the result that the output rod 3 stops at its stroke end. It is to be noted that the pivotal arm 12 is so configured that its side face 12c or 12d is parallel with the tangent to the pin 11A or 11B at the contact point of the side face 12c or 12d with the pin 11A or 11B so that only the pin 11A or 11B is capable of rotating about the main shaft 10 when the output rod 3 has reached its stroke end, i.e., the radial direction (the direction formed by drawing a line from the center of the main shaft 10 to the contact point of the pin 11 with the side face 12c or 12d) of the pin 11 disposed on a circular locus which coincides with the normal line with respect to the side face 12c or 12d.

Figure 5:
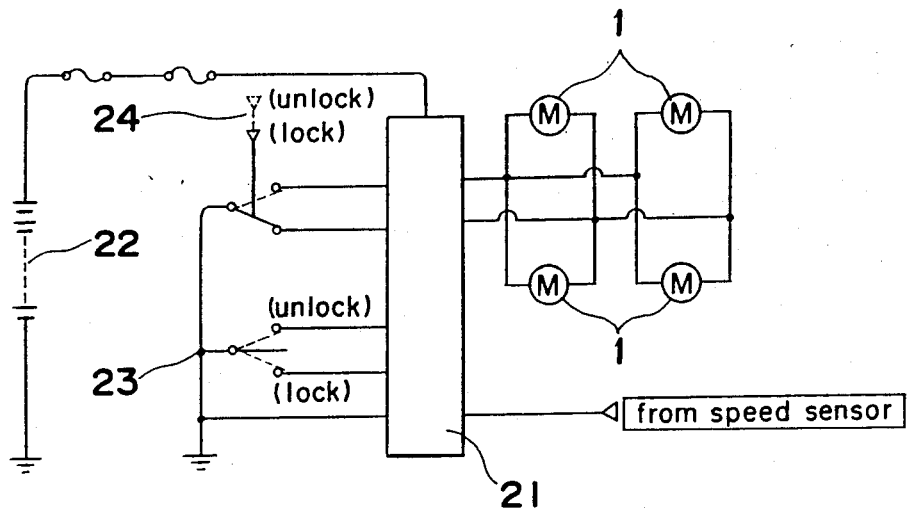
FIG. 5 a circuit diagram showing a door lock mechanism.

As shown in FIG. 5, when the electric actuator 1 for locking the door is used in a vehicle, it is mounted on each of the doors. The electric actuators 1 is energized by connecting the electric actuator 1 to a battery 22 through an automatic door lock control unit 21 which is connected to a switch 23 disposed near a driver's seat and door lock knobs 24 mounted on the doors.

The operation of the above-described door lock device is described with reference to FIGS. 6 and 7.

Figure 6I:
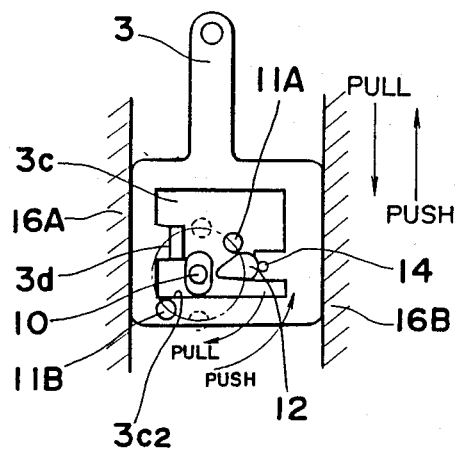
FIGS. 6 (I), (II), and (III) are schematic diagrams showing the orders of movement and operation of an output rod.
Figure 6:
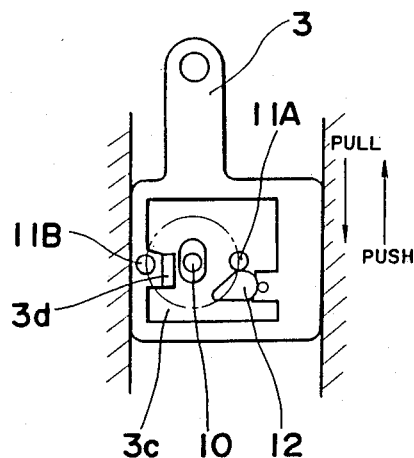

When an unlocking operation is performed, the pins 11A and 11B are in the positions shown by broken lines in FIGS. 6 (I) and 7 (I). When the motor 4 is actuated by operating the switch 23 in order to lock the door, the rotation of the motor 4 is transmitted to the gear 9 through the gears 5, 6, and 8 as shown by arrows. Caused by the clockwise rotation of the gear 9, the pins 11A and 11B move to the positions shown by solid lines. The pin 11A contacts with the side face 12c of the pivotal arm 12 in this position. As shown in FIG. 6 (II) and 7 (II), while the motor 4 is rotating, the pin 11A rotates the pivotal arm 12 under pressure, with the result that the output rod 3 is moved in the pull direction (downward direction shown in FIGS. 6 (I) and (II). While the pin 11A in contact with the pivotal arm 12 is moving the output rod 3 rectilinearly the pin 11B is making a circular movement in contact neither with the stopper 3d nor with the pivotal arm 12. FIG. 6 (III) shows the condition in which as a result of the movement of the output rod 3 in the pull direction caused by the pressing force of the pin 11A, the output rod 3 reaches the stroke end at which the edge face 3c₁ of the opening 3c of the output rod 3 contacts with the main shaft 10. The output rod 3 is unmovable in this position. As shown in FIG. 7 (III), the pin 11A shown by a broken line continues its circular movement, so that the pivotal arm 12 is rotating about the pin 14 in contact with the pin 11A. At this time, the pivotal arm 12 is so configured that its side face 12c is parallel with the tangent to the pin 11A at the contact point of the side face 12c with the pin 11A. When the pin 11A contacts with the stopper 3d as shown by the solid line in FIGS. 6 (III) and 7 (III), the gear 9 stops its rotation.

When the output rod 3 is moving in the pull direction and reaches its stroke end, the door lock member is locked. At this time, the pivotal arm 12 is out of contact with the pins 11A and 11B, and as such, no load is applied to the pivotal arm 12. Therefore, the pivotal arm 12 is returned to its neutral position by the spring 13, i.e., the pivotal arm 12 confronts the stopper 3d.

Figure 7I:
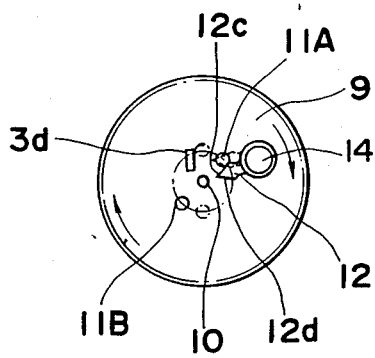
FIGS. 7 (I), (II), (III), (IV), (V), (VI), and (VII) are explanatory views showing the operation of a clutch.
Figure 7:
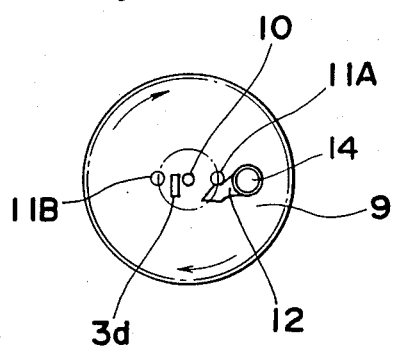
Figure 7:
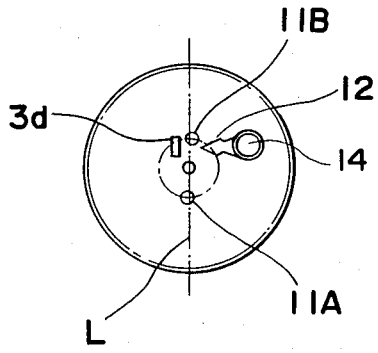
Figure 7V:
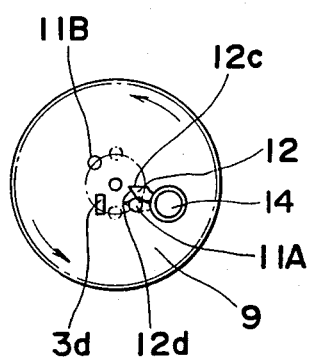
Figure 7:
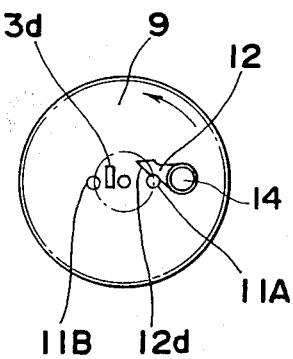

When the door lock member is thus locked as shown in FIG. 7 (IV), the line (L) drawn from the pin 11A to the pin 11B is parallel with the pull and push directions, and neither the pins 11A nor the pin 11B contact with the stopper 3d. Accordingly, the output rod is pulled or pushed by manually operating the lock knob 24. That is, the output rod 3 can be manually moved in the push direction from the lock position shown by FIGS. 6 (III) and 7 (III). When the edge face 3c₂ of the opening 3c contacts with the main shaft 10, i.e., when the output rod 3 reaches its stroke end, the output rod 3 takes the unlocking position and the door is unlocked by the door lock member. Similarly, when the output rod 3 is manually operated in the pull direction in the unlocked position, neither the pin 11A nor the pin 11B contacts with the stopper 3d. Thus, the output rod 3 is moved to the lock position as shown in FIG. 7 (III).

On the other hand, when an unlocking operation is performed by operating the switch 23, the motor 4 is reversed, i.e., the pins 11A and 11B move from the positions shown by broken lines shown in FIG. 7 (V) to the positions shown by solid lines caused by the counterclockwise rotation of the gear 9. The pin 11A is brought into contact with the side face 12d of the pivotal arm 12 in the position shown by the solid line. Thereafter, the pin 11A rotates the pivotal arm 12 under pressure in the direction shown by the arrow in FIG. 7 (VI). Thus, the output rod 3 is moved in the push direction. FIG. 7 (VII) shows the condition in which the output rod 3 is moved in the push direction by the pin 11A and has reached its stroke end at which the edge face $3c_2$ of the opening 3c of the output rod 3 contacts with the main shaft 10. During this period of time, the rotation of the gear 9 allows the pin 11A to rotate the pivotal arm 12 under pressure on the pin 14. After the pin 11A is out of contact with the pivotal arm 12, only the pin 11A makes a circular motion and contacts with the stopper 3d. Thus, the pin 11A stops its movement, and the pivotal arm 12 is returned to its neutral position by the spring 13. The unlocking position of the coupling (A) is the same as the unlocking position thereof provided by manually operating the door knob 24. The position of the coupling (A) is shown by the broken lines shown in FIG. 6 (I) and FIG. 7 (I).

Figure 8:
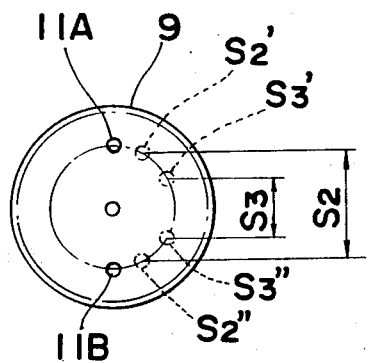
FIG. 8 is a schematic diagram showing the alteration of the stroke of an output.
Figure 9I:
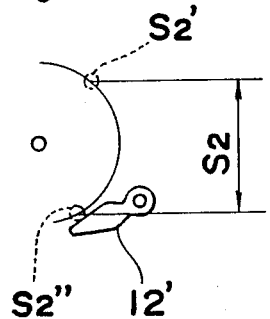
FIGS. 9 (I) and (II) are schematic diagrams showing the alteration of the stroke of an output rod caused by the change of the angle formed between the side faces of the pivotal arm.
Figure 9:
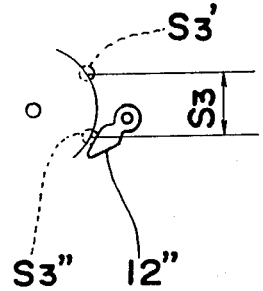

The stroke of the output rod 3 of the door lock device according to the present invention can be changed by changing the angle formed by the side face 12c with respect to the side face 12d of the pivotal arm 12 instead of changing the positions of the pins 11A and 11B. That is, as shown in FIGS. 8 and 9 (I) and (II), the position in which the pin 11A or 11B is out of contact with the pivotal arm 12 can be changed. As shown in FIG. 9 (I), when the stroke of the output rod 3 is set to be S2, the positions the pin 11 is out of contact with the pivotal arm 12 are S2′ and S2″. If the stroke of the output rod 3 is set to be S3 as shown in FIG. 9 (II), the positions the pin 11 is out of contact with the pivotal arm 12 are S3′ and S3″.

As apparent from the foregoing description, in the electric actuator according to the present invention, the rotation of the motor is transmitted to the output rod through the pin mounted on the gear connected to the motor through the other gears, the stopper formed on the output rod connected to the external operation member such as the door knob, and the pivotal arm mounted on the output rod. Since the coupling which does not transmit the movement of the output rod caused by an external operation is provided, the door is locked or unlocked not only by a remote control, but also by a manual operation of the door knob. Furthermore, when the output rod has been locked or unlocked during the operation of the electric actuator, the pins contact with the stopper. As a result, the pins stop. Accordingly, the generation of an uncomfortable sound can be prevented and the output rod can be accurately stopped. In addition, the stroke of the output rod can be set without providing the electric actuator with large members to be connected to the output rod. Thus, a long stroke of the output rod can be provided by a compact electric actuator.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric actuator in which an external operation member is controlled by an electric motor, comprising:
    a gear rotatably mounted on a main shaft fixed to a casing and driven by said motor mounted in the casing;
    an output rod having a top portion projecting from the casing being connected to the external operation member and rectilinearly reciprocatively mounted on the casing;
    a coupling is provided between said gear and said output rod and transmits the rotation of said motor to said output rod so that the output rod is reciprocated, and transmits the reciprocative motion of said output rod applied from the external operation member neither to said gear nor to said motor;
    said coupling including a pin mounted on said gear and said output rod including a pivotal arm and a stopper brought into and out of contact with said pin; and
    an opening to allow the rectilinear movement of said opening to be free relative to said main shaft of said gear provided therein; whereby rotation of said gear caused by said motor allows said pin to be brought into contact with said pivotal arm, and said pin is stopped when said pin contacts with said stopper.

2. An electric actuator as claimed in claim 1, wherein when said output rod is manually operated to move from the position in which said pin has stopped, said coupling takes the position at which neither said pivotal arm nor said stopper contact with said pin, so that the operation of said output rod can be controlled by the external operation member without interlocking said output rod with said motor and said gear.

3. An electric actuator as claimed in claim 1, wherein said pivotal arm is so configured that side face thereof is parallel with the tangent to said pin at the contact point of said side face with said pin so that only the pin is capable of making a circular movement when said output rod has reached the stroke end thereof and that said pivotal arm is returned to a predetermined position by a spring after said pin is out of contact with said pivotal arm.

4. An electric actuator as claimed in claim 1, wherein said stopper prevents said pin from making a circular movement in the direction in which said pin becomes remote from said pivotal arm only when said pin is brought out of contact with said pivotal arm after said output rod reaches the stroke end thereof.

* * * * *